(12) United States Patent
Singla et al.

(10) Patent No.: US 8,705,954 B2
(45) Date of Patent: Apr. 22, 2014

(54) OPTICAL SWITCHING NETWORK

(75) Inventors: Ankit Singla, Urbana, IL (US); Atul Singh, Princeton, NJ (US); Kishore Ramachandran, North Brunswick, NJ (US); Lei Xu, Princeton Junction, NJ (US); Yueping Zhang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 211 days.

(21) Appl. No.: 13/078,980

(22) Filed: Apr. 3, 2011

(65) Prior Publication Data

US 2012/0008945 A1  Jan. 12, 2012

Related U.S. Application Data

(60) Provisional application No. 61/362,482, filed on Jul. 8, 2010, provisional application No. 61/436,283, filed on Jan. 26, 2011.

(51) Int. Cl.
*H04J 14/02* (2006.01)

(52) U.S. Cl.
CPC ......... *H04J 14/0212* (2013.01); *H04J 14/0204* (2013.01); *H04J 14/0217* (2013.01)
USPC .................................. 398/14; 398/50; 398/56

(58) Field of Classification Search
CPC  H04J 14/0212; H04J 14/0204; H04J 14/0217
USPC .......................................... 398/14, 50, 56, 55
See application file for complete search history.

(56) References Cited

U.S. PATENT DOCUMENTS

| | | | | |
|---|---|---|---|---|
| 5,953,141 A | * | 9/1999 | Liu et al. ........................ | 398/83 |
| 8,155,520 B1 | * | 4/2012 | West et al. .................... | 398/50 |
| 2010/0309449 A1 | * | 12/2010 | Horn et al. .................... | 355/71 |
| 2012/0170928 A1 | * | 7/2012 | Tanaka et al. .................. | 398/28 |

OTHER PUBLICATIONS

N. Farrington, G. Porter, S. Radhakrishnan, H. H. Bazzaz, V. Subramanya, Y. Fainman, G. Papen, and A. Vandat, "Helios: A hybrid electrical/optical switch architecture for modular data centers." In ACM SIGCOMM, 2010.
G. Wang, D. G. Andersen, M. Kaminsky, K. Papagiannaki, T. S. E. Ng, M. Kozuch, and M. Ryan. "c-Through: Part-time optics in data centers." In ACM SIGCOMM, 2010.
Mina Youssef, Caterina Scoglio, "On graph-based characteristics of optimal overlay topologies. Computer Networks", 53(7):913-925, 2009.
Malathi Veeraraghavan, and Xuan Zheng, "A Reconfigurable Ethernet/SONET Circuit Based Metro Network Architecture", 2004.

* cited by examiner

*Primary Examiner* — Danny Leung
(74) *Attorney, Agent, or Firm* — Joseph Kolodka

(57) ABSTRACT

An all-optical transmission system includes an optical switch matrix, a plurality of optical components communicating over the optical switch matrix, and a top of rack (ToR) switch coupled to each optical component. Each ToR switch communicates with the optical components and with other ToR switches. The optical component includes a send circuit and a receive circuit with the send circuit having a ToR transceiver to receive data, a multiplexer coupled to the ToR transceiver, a Wavelength Selective Switch (WSS) coupled to the multiplexer, and a circulator coupled to the WSS.

19 Claims, 7 Drawing Sheets

OPTICAL SWITCHING NETWORK

The present application claims priority to Provisional Application Ser. Nos. 61/362,482, filed Jul. 8, 2010, and 61/436,283, filed on Jan. 26, 2011, the contents of which are incorporated by reference.

BACKGROUND

The present invention relates to an optical switching network.

Two key challenges faced by existing data center network (DCN) architectures are (a) balancing the demand for high bandwidth connectivity between all pairs of servers with the associated high cost, and (b) having the flexibility to support a variety of applications and their traffic demand.

Many online services, such as those offered by Amazon, Google, FaceBook, and eBay, are powered by massive data centers hosting tens to hundreds of thousands of servers. The network interconnect of the data center plays a key role in the performance and scalability of these services. As application traffic and the number of hosted applications grow, the industry is constantly looking for larger server-pools, higher bitrate network-interconnects, and smarter workload placement approaches to effectively utilize the network resources. To meet these goals, a careful examination of traffic characteristics, operator requirements, and network technology trends is critical High bandwidth, static network connectivity between all server pairs ensures that the network can support an arbitrary application mix. However, static network topologies that provide such connectivity tend to be quite expensive (in terms of both the startup as well as recurring costs), and cannot scale beyond a certain number of interconnected servers. Further, for many applications, all-to-all connectivity at all times is not needed, and hence static network connectivity can be quite wasteful in these cases. Finally, such topologies also suffer from the need to ""re-wire"" the network to support greater network bandwidth demands from future applications.

Existing DCN architecture proposals attempt to address these challenges by using a hybrid approach that combines small-scale, all-to-all connectivity using electrical interconnects with alternative data transmission technologies (e.g. high-speed wireless or optical switching) that provide flexibility in terms of adapting to traffic demands. In these approaches, the workload is split between the electrical and optical network paths such that peak traffic is offloaded to the extra paths (could be wireless/optical/electrical). This use of optical or wireless transmission technologies as an add-on, as opposed to a fundamental component of the architecture, limits the applicability of these solutions to today's network traffic patterns and bandwidth demands—the base network topology is not flexible and is built on the assumption that average traffic patterns are known in advance. In addition, these solutions also suffer from the need to re-wire the electrical network to support higher throughputs.

SUMMARY

In one aspect, systems and methods are disclosed for a method to communicate over an optical network by using hop-by-hop routing over an optical network; and dynamically constructing a network topology.

In one aspect, a method to communicate over an optical network includes dynamically constructing a network topology based on traffic demands and hop-by-hop routing; and constructing a dynamically changing data center network (DCN) architecture.

In another aspect, a method for interconnecting a data center network includes using hop-by-hop routing over an optical network.

In yet another aspect, a method for interconnecting a data center network includes using hop-by-hop routing over an optical network; and using bidirectional optical network devices to enable bidirectional communication over fiber.

In a further aspect, a method for interconnecting a data center network includes using hop-by-hop routing over an optical network; using bidirectional optical network devices to enable bidirectional communication over fiber; and dynamically constructing a network topology.

In yet another aspect, a method for interconnecting a data center with an optical network includes using bidirectional optical network devices to enable bidirectional communication over fiber.

Advantages of the preferred embodiment may include one or more of the following. The system is the first-ever all-optical switching architecture for data center networks (DCNs). By exploiting runtime reconfigurable optical devices, the system can dynamically change network topology as well as link capacities, thus achieving unprecedented flexibility to adapt to different traffic patterns.

The system addresses these drawbacks of static network topologies by providing a dynamic DCN architecture that can adapt to application traffic demands in an efficient manner while also supporting high bandwidth server-to-server connectivity. The key feature is that allows any subset of servers to be connected at full-bandwidth in an on-demand manner without requiring static, all-to-all full bandwidth connectivity.

The preferred embodiment can adapt the network topology based on application traffic demands, while also supporting high bandwidth connectivity between any subset of servers. To accomplish these challenging tasks, the system uses three basic building blocks: (1) an innovative placement of optical devices, (2) algorithms for adaptive network reconfiguration (Procedure 2(a), 2(b), 3, and 5) based on traffic demand dynamics, and (3) hop-by-hop routing (Procedure 6).

The innovative placement of optical devices allows this preferred embodiment to use re-configurable optical paths. This enables the system to be flexible in terms of path and capacity assignment between the servers. Exactly how these paths are re-configured to interconnect servers, as well as the capacity of each path, is controlled by our adaptive network re-configuration algorithms. By extensively using optical fibers that have the ability to support higher bandwidths simply by adding wavelengths, higher throughputs can be supported without re-wiring. As Proteus does not impose the requirement of underlying all-to-all electrical connectivity between the servers, and due to the physical limitation on the number of possible optical paths between servers, the inclusion of hop-by-hop routing is necessary in our design. The intuition here is that if a direct optical path does not exist, a hop-by-hop path can be used instead. For this purpose, we include a multi-hop routing protocol that uses source-routing.

Other advantages of the preferred embodiment may include one or more of the following:

1) On-demand flexibility: Proteus does not make any assumption on traffic patterns and is able to adaptively reconstruct network communication paths based on traffic demand. This makes the preferred embodiment highly appealing to future data centers where both the network and application may evolve over time."

2) High server-to-server throughput: Proteus significantly improves the communication bandwidth between any pair of servers. Once the optical circuit path is set up, a bit rate transparent communication pipe becomes available. With current technologies, per channel bit rate in optical fiber communications can be as high as 40 Gb/s or 100 Gb/s, and the total capacity per fiber with DWDM technologies can reach 69 Tb/s.

3) Efficient network resource utilization: Network paths are dynamically constructed based on traffic demand in such a way that overall network-wide traffic can be maximally served. This global optimization overcomes network resource fragmentation incurred by today's tree-based DCN architectures and other existing approaches where local optimization is adopted.

4) Cabling simplicity: One of challenges faced by current data center networks is caused by the high complexity of a large number of connecting cables. With the adoption of optical fiber cabling, network upgrades and expansion can be achieved by adding additional wavelengths, instead of additional cables.

5) Lower power consumption: Optical components generally consume a fraction of energy relative to their electrical counterparts, and since this preferred embodiment uses optical components extensively, the overall DCN power consumption should be lowered significantly.

DETAILED DESCRIPTION

Figure 1:
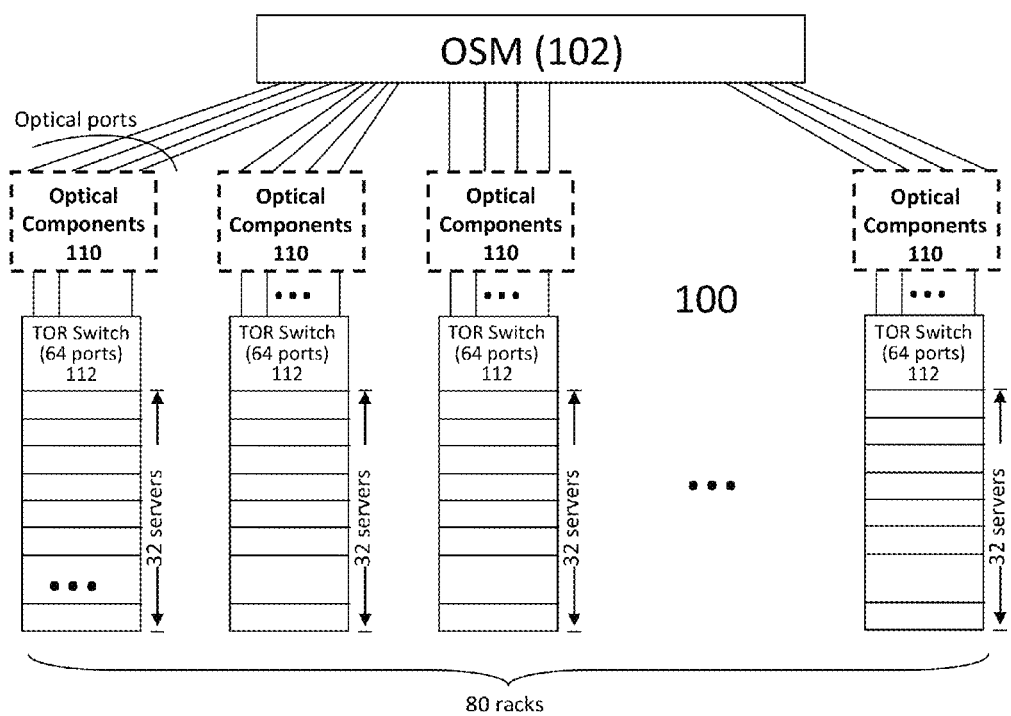
FIG. 1 shows an exemplary system with optical interconnects in a data center network.

FIG. 1 shows an exemplary system with optical interconnects in a data center network. An optical switch matrix (OSM) 102 allows a plurality of optical ports to communicate with each other through optical components 110. Each optical component 110 in turn communicates with a top of rack (ToR) switch. Each ToR switch in turn is connected to plurality of servers and to other ToRs.

The system of FIG. 1 uses hop-by-hop routing, in which traffic that cannot be provisioned with a direct end-to-end circuit will be routed to the destination by traversing multiple hops (i.e., TOR switches). Each TOR switch not only receives traffic destined at servers located in its own rack, but also forwards transit traffic targeted at servers residing in other racks. This mechanism allows the system of FIG. 1 to achieve connectivity between any pair of origin and destination servers. This approach is in contrast to conventional optical communication systems, in which only single-hop routing is employed.

In one particular instantiation, each TOR switch is a conventional switch with 64 10-GigE ports. Of these 64 ports at each ToR, 32 are connected to servers via existing intra-ToR interconnects. Each of the remaining 32 ports is used to connect to the optical interconnect between ToRs. Each inter-ToR port is attached to transceivers associated with a fixed wavelength for sending and receiving data. Excluding the ToR switches, all the remaining interconnect elements are optical. These optical elements allow for reconfiguration, making the network highly adaptive to changes in the underlying traffic requirements.

The system of FIG. 1 uses all optical interconnects. In contrast to their electrical counterparts, optical network elements support on-demand provisioning of connectivity and capacity where required in the network, thus permitting the construction of thin, but malleable interconnects for large server pools. Optical links can support higher bit-rates over longer distances using less power than copper cables. Moreover, optical switches run cooler than electrical ones, implying lower heat dissipation and cheaper cooling cost.

Figure 2:
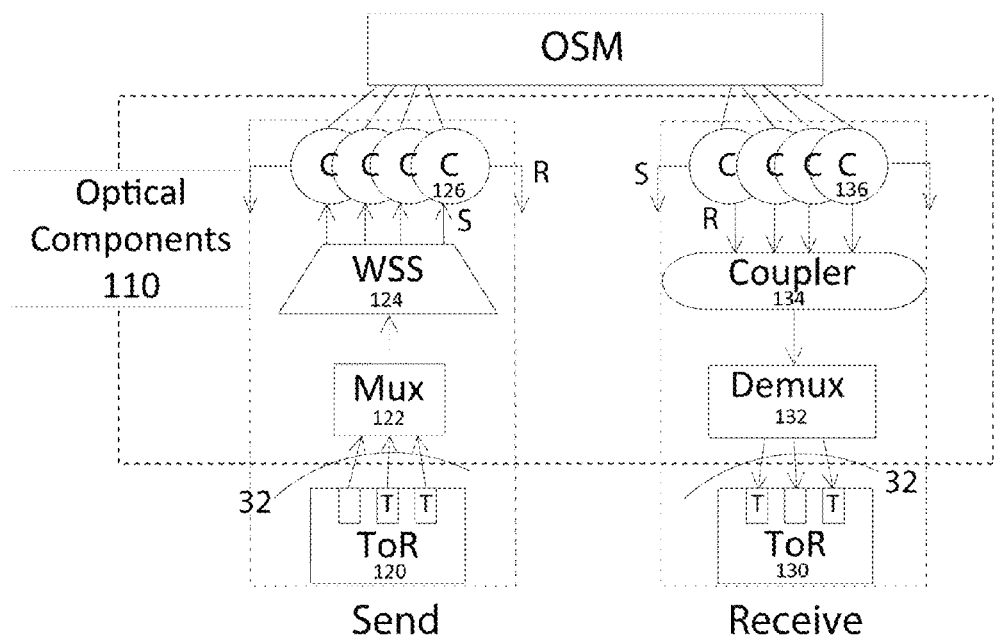
FIG. 2 shows in more details the optical component of FIG. 1.

FIG. 2 shows in more details the optical component 110. To make full use of the MEMS ports, each circuit over the MEMS is bidirectional. For this, optical circulators 126 and 136 are placed between the ToR and MEMS ports. A circulator 126 connects the send channel of the transceiver from a ToR 120 to the MEMS port 102 (after the channel has passed through the WSS 124). It simultaneously delivers the traffic incoming towards a ToR from the MEMS, to this ToR. Even though the MEMS edges are bidirectional, the capacities of the two directions are independent of each other. The inter-ToR ports attach themselves to two transceivers so that they can send and receive data simultaneously. As shown in the left half of FIG. 2, the optical fiber from the "send" transceivers from each of the 32 ports at a ToR 120 is connected to an optical multiplexer 122. Each port is associated with a wavelength, unique across ports at the ToR 120, in order to exploit wavelength division multiplexing (WDM). This allows data from different ports to be multiplexed into one fiber without contention. This fiber is then connected to a 1×4 Wavelength Selective Switch (WSS) 124. The WSS 124 is typically an optical component, consisting of one common port and wavelength ports. It partitions the set of wavelengths coming in through the common port among the wavelength ports and the mapping is runtime-configurable (in a few milliseconds). The WSS 124 can split the set of 32 wavelengths it sees into four groups, each group being transmitted out on its own fiber. This fiber is connected to the MEMS optical switch 102 through a circulator 126 to enable bidirectional traffic through it. The circulators enable bidirectional optical transmission over a fiber, allowing more efficient use of the ports of optical switches. An optical circulator is a three-port device: one port is a shared fiber or switching port, and the other two ports serve as send and receive ports. Optical transceivers can be of two types: coarse WDM (CWDM) and dense WDM (DWDM). One embodiment uses DWDM-based transceivers, which support higher bit-rates and more wavelength channels in a single piece of fiber compared to CWDM.

The receiving infrastructure (shown in the right half of FIG. 2) has a coupler 136 connected to a demultiplexer 132 which separates multiple incoming wavelengths, each then delivered to a different port. In one embodiment, four receive fibers from each of four circulators, are connected to a power coupler 134 which combines their wavelengths onto one optical fiber. This fiber feeds into a demultiplexer 132 which splits each incoming wavelength to its associated port for a TOR 130. In one embodiment, the interconnect of FIG. 1 uses a 320-port micro-electrical mechanical systems (MEMS) switch, to connect 80 ToRs with a total of 2560 servers.

Depending on the channel spacing, using WDM, a number of channels or wavelengths can be transmitted over a single piece of fiber in the conventional or C-band. In one embodiment, each wavelength is rate-limited by the electrical port it is connected to. The OSM modules in optical communications can be bipartite switching matrices where any input port can be connected to any one of the output ports. Micro-Electro-Mechanical Switch (MEMS) can be used as an OSM and achieves reconfigurable one-to-one circuit between its input and output ports by mechanically adjusting micro mirrors.

The system of FIG. 2 offers highly flexible bandwidth. Every ToR has degree k. If each edge had fixed bandwidth, multiple edges would need to be utilized for this ToR to communicate with another ToR at a rate higher than a single edge supports. To overcome this problem, the system combines the capability of optical fibers to carry multiple wavelengths at the same time (WDM) with the dynamic reconfigurability of the WSS. Consequently, a ToR is connected to MEMS through a multiplexer and a WSS unit.

Specifically, suppose ToR A wants to communicate with ToR B using w times the line speed of a single port. The ToR will use w ports, each associated with a (unique) wavelength, to serve this request. WDM enables these w wavelengths, together with the rest from this ToR, to be multiplexed into one optical fiber that feeds the WSS. The WSS splits these w wavelengths to the appropriate MEMS port which has a circuit to ToR B (doing likewise for k−1 other sets of wavelengths). Thus, a w×(line-speed) capacity circuit is set up from A to B, at runtime. By varying the value of w for every MEMS circuit connection, the system offers dynamic capacity for every edge.

In one embodiment, each ToR can communicate simultaneously with any four other ToRs. Thus, the MEMS switch 102 can construct all possible 4-regular ToR interconnection graphs. Secondly, through WSS configuration, each of these four links' capacity can be varied in $\{0, 10, 20, \ldots, 320\}$ Gbps, provided the sum does not exceed 320 Gbps. Thus, both the path between servers as well as the capacity of these paths can be varied in this architecture.

To enable a ToR pair to communicate using all available wavelengths, each ToR port (facing the optical interconnect) is assigned a wavelength unique across ports at the ToR. The same wavelength is used to receive traffic as well: each port thus sends and receives traffic at one fixed wavelength. The same set of wavelengths is recycled across ToRs. This allows all wavelengths at one ToR to be multiplexed and delivered after demultiplexing to individual ports at the destination ToR. This wavelength-port association is a static, design/build time decision.

One exemplary specific instantiation of FIG. 1 deploys N=80 ToRs, W=32 wavelengths and k=4 ToR-degree using a 320 port MEMS to support 2560 servers. Each ToR is a conventional electrical switch with 64 10-GigE non-blocking ports. 32 of these ports are connected to servers, while the remaining face the optical interconnect. Each port facing the optical interconnect has a transceiver associated with a fixed and unique wavelength for sending and receiving data. The transceiver uses separate fibers to connect to the send and receive infrastructures. The send fiber from the transceivers from each of the 32 ports at a ToR is connected to an optical multiplexer. The multiplexer feeds a 1×4 WSS. The WSS splits the set of 32 wavelengths it sees into 4 groups, each group being transmitted on its own fiber. These fibers are connected to the MEMS switch through circulators to enable bidirectional traffic through them. The 4 receive fibers from each of 4 circulators corresponding to a ToR are connected to a power coupler (similar to a multiplexer, but simpler), which combines their wavelengths onto one fiber. This fiber feeds a demultiplexer, which splits each incoming wavelength to its associated port on the ToR.

In this interconnect, each ToR can communicate simultaneously with any 4 other ToRs. This implies that MEMS reconfigurations allow us to construct all possible 4-regular ToR graphs. Second, through WSS configuration, each of these 4 links' capacity can be varied in $\{0, 10, 20, \ldots 320\}$ Gbps. As discussed in more details below, these configurations are decided by a centralized manager. The manager obtains the traffic matrix from the ToR switches, calculates appropriate configurations, and pushes them to the MEMS, WSS, and ToRs. This requires direct, out-of-band connections between the manager and these units. The implementation is highly flexible—given a number N of Top-of-Rack (ToR) switches and a design-time-fixed parameter k, the system can assume any k-regular topology over the N ToRs. To illustrate how many options this gives, consider that for just N=20, there are over 12 billion (non-isomorphic) connected 4-regular graphs. In addition, the system allows the capacity of each edge in this k-regular topology to be varied from a few Gb/s to a few hundred Gb/s. Simulations show that the system can always deliver full bisection bandwidth for low-degree (e.g., inter-ToR≤4) traffic patterns, and even over 60% of throughput of a non-blocking network in case of moderately high-degree (e.g., inter-ToR e [4,20]) traffic patterns. Furthermore, it enables lower (50%) power consumption and lower (20%) cabling complexity compared to a fat-tree connecting a similar number of servers. While at current retail prices, the system is marginally more costly (10%) than a fat-tree (at 10 GigE per-port), a cost advantage should materialize as optical equipment sees commoditization, and higher bit-rates gain traction.

With a larger number of MEMS and WSS ports, topologies with higher degrees and/or larger numbers of ToRs can be built. It is also possible to make heterogeneous interconnects—a few nodes can have larger degree than the rest.

The system of FIGS. 1-2 achieves topology flexibility by exploiting the reconfigurability of the MEMS. Given a ToR-graph connected by optical circuits through the MEMS, the system uses hop-by-hop stitching of such circuits to achieve network connectivity. To reach ToRs not directly connected to it through the MEMS, a ToR uses one of its connections. This first-hop ToR receives the transmission over fiber, converts it to electrical signals, reads the packet header, and routes it towards the destination. At each hop, every packet experiences conversion from optics to electronics and then back to optics (O-E-O). Such conversion can be done in sub-nanosecond level. At any port, the aggregate transit, incoming and outgoing traffic cannot exceed the port's capacity in each direction. So, high-volume connections must use a minimal number of hops. The system manages the topology to adhere to this requirement.

To support adapting to a wider variety of traffic patterns, the flexible DCN architecture of FIG. 1 also needs topology management manager that (a) configure the MEMs to adjust the topology to localize high traffic volumes, b) configure the WSS at each ToR to adjust the capacity of its four outgoing links to provision bandwidth where it is most gainful, and (c) pick routes between ToR-pairs to achieve high throughput, low latency and minimal network congestion.

The control software run by the topology manager solves this problem of topology management, which can be formulated as a mixed-integer linear program. In the following discussion, a traffic demand D between ToRs—$D_{ij}$ is the desired bandwidth from $ToR_i$ to $ToR_j$.

Variables: Four classes of variables: $l_{ij}=1$ if $ToR_i$ is connected to $ToR_j$ through MEMS and 0 otherwise; $w_{ijk}=1$ if $l_{ij}$ carries wavelength $\lambda_k$ in the i→j direction and 0 otherwise; a traffic-served matrix S—$S_{ij}$ is the bandwidth provisioned (possibly over multiple paths) from $ToR_i$ to $ToR_j$; $v_{ijk}$ is the volume of traffic carried by wavelength $\lambda_k$ along i→j. Among the latter two sets of variables, $S_{ij}$ have end-to-end meaning, while $v_{ijk}$ have hop-to-hop significance. For all variables, $k \in \{1, 2 \ldots, \lambda_{Total}\}$; $i,j \in \{1, 2, \ldots, \#ToRs\}$, $i \neq j$; $l_{ij}$ are the only variables for which $l_{ij}=l_{ji}$ always holds—all other variables are directional.

Objective: A simplistic objective is to maximize the traffic served (constrained by demand, see (6)):

$$\text{Maximize} \sum_{i,j} S_{ij}. \quad (1)$$

Constraints:
A wavelength $\lambda_k$ can only be used between two ToRs if they are connected through MEMS:

$$\forall i,j,k: w_{ijk} \leq l_{ij}. \quad (2)$$

Figure 3:
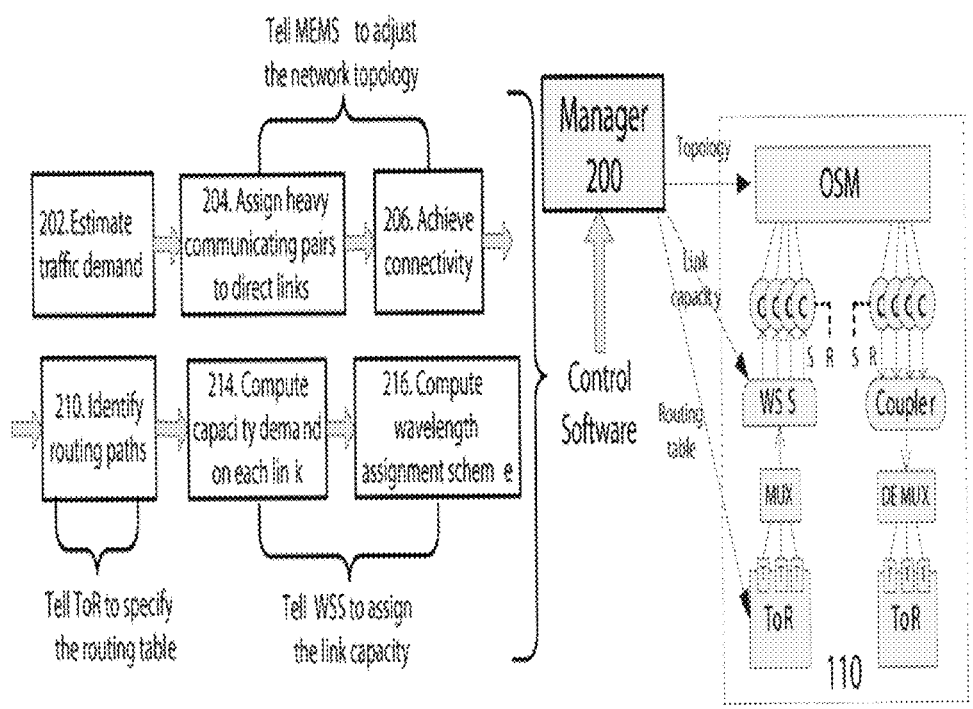
FIG. 3 shows an exemplary control manager for the system of FIG. 1.

$ToR_i$ can receive/send $\lambda_k$ from/to at most one ToR (this is illustrated in FIG. 3):

$$\forall i,k: \sum_j w_{jik} \leq 1; \sum_j w_{ijk} \leq 1. \quad (3)$$

If the number of ports of the WSS units is W, then $ToR_i$ is connected to exactly W other ToRs:

$$\forall i: \sum_j l_{ij} = W. \quad (4)$$

Hop-by-hop traffic is limited by port capacities ($C_{port}$), wavelength capacity ($C_\lambda$), and provisioning:

$$\forall i,j,k: v_{ijk} \leq \min\{C_{port}, C_\lambda \times w_{ijk}\}. \quad (5)$$

A constraint is to never provision more traffic than demanded:

$$\forall i,j: S_{ij} \leq D_{ij}. \quad (6)$$

The outgoing transit traffic (total traffic flowing out, minus total traffic for which $ToR_i$ is the origin) equals incoming transit traffic at $ToR_i$:

$$\forall i: \sum_{j,k} v_{ijk} - \sum_j S_{ij} = \sum_{j,k} v_{jik} - \sum_j S_{ji}. \quad (7)$$

The above mixed-integer linear program (MILP) can be seen as a maximum multi-commodity flow problem with degree bounds, further generalized to allow constrained choices in edge capacities. While several variants of the degree-bounded subgraph and maximum flow problems have known polynomial time algorithms, trivial combinations of two are known to be NP-hard. Thus, to simplify the computation, we present heuristic approaches for the control software for finding the optimized topology and link capacity assignment to meet the changing traffic patterns is discussed.

The control software tightly interacts with OSM/MEMS, WSS and ToR switches to control the network topology, link capacity and routing.

FIG. 3 shows an exemplary control manager 200 that controls the system 100 of FIG. 1. The control system includes a module 202 that estimates traffic demand. The module 202 provides input to a module 204 that assigns pairs with heavy communications to direct links. Next a module 206 performs the connectivity accordingly. Through modules 204-206, the manager 200 controls the MEMS optical switch 102 to adjust the network topology. Next, a module 210 identifies routing paths and sends all the ToRs these paths in order to set up their routing tables. A module 214 then determines the capacity demand on each link and a module 216 then determines the wavelength assignment scheme.

In one embodiment, as conventionally done, the software estimates the traffic demand according to max-min fair bandwidth allocation for TCP flows in an ideal non-blocking network. All the flows are only limited by the sender or receiver network interface cards (NICs).

The manager assigns direct links for heavy communicating pairs. High-volume communicating pairs (i.e., ToR switches) over direct MEMS circuit links. This is accomplished by using a weighted b-matching, where b represents the number of connections that each ToR has to MEMS (b=4 in our example scenario). It is easy to cast the problem of localizing high-volume ToR-connections to b-matching: In the ToR graph, assign the edge-weight between two ToRs as the estimated flow-size between them. Weighted b-matching is a graph theoretic problem for which an elegant polynomial-time algorithm is known. In one embodiment, the weighted b-matching algorithm is approximated using multiple 1-matchings.

Connectivity is achieved through the edge-exchange operation as follows. First, the method locates all connected components. If the graph is not connected, the method selects two edges a→b and c→d with lowest weights in different connected components, and simply replace links a→b and c→d with links a→c and b→d to connect them. A check is done to make sure that the links removed are not themselves cuts in the graph. The output of steps 2 and 3 is used to tell the MEMS optical switch 102 how to configure the network topology.

Once connectivity is determined, the MEMS optical switch configuration is known. The method finds routes using any of the standard routing schemes such as the shortest path or a low congestion routing scheme. Some of the routes are single-hop MEMS connection while others are multi-hop MEMS connections. In one implementation, the standard shortest path technique is used to calculate the routing paths. However, the framework can be readily applied to any other routing scheme. The output is used to tell ToRs on how to configure their routing tables.

Given the routing and the estimated traffic demand (aggregated) between each pair of ToRs, the method computes the link capacity desired on each link. To satisfy the capacity demand on each link, multiple wavelengths may be used. However, the sum of capacity demands of all links associated with a ToR switch must not exceed the capacity of this ToR.

After figuring out the desired capacity on each link, the system needs to provision wavelengths appropriately to serve these demands. This problem is reduced to an edge-coloring problem on a multigraph. Multiple edges correspond to volume of traffic between two nodes, and wavelengths are the colors to be used to color these edges. For instance, D→A and B→A cannot both use the same wavelength. This constraint stems from the fact that two data-flows encoded over the same wavelength can not share the same optical fiber in the same direction. Various fast edge-coloring heuristics can be used, and an algorithm based on Vizing's theorem is used in one embodiment due to speed and code availability.

On implementation requires at least one wavelength to be assigned to each edge on the physical topology. This guarantees an available path between any ToR-pair, which may be required for mice/bursty flows. The output is used to tell WSS on how to assign wavelengths.

During the operation, the system works based on the value of η. η is defined as the expected throughput achieved via the link capacity adjustment versus that achieved via network topology change. If the throughput obtained by only adjusting link capacity is significant enough compared to that obtained by rearranging the topology, the system can adjust link capacity while keep the current topology. This is cheaper than changing the topology since topology changes necessitate change in the routing tables of ToRs. It is possible that the traffic pattern is fundamentally changed so that only adjusting the link capacity cannot provide a satisfactory throughput. In this case, the system reconfigures the network topology. In practice, the system can modify η on-demand to satisfy different performance requirements.

Due to easy availability of network state (e.g., topology, traffic demand etc) at the manager, routing can be easily realized in a centralized manner, where the manager is responsible for calculating and updating the routing table for each ToR. For simplicity, the manager employ shortest path routing with failover paths. However, any other sophisticated routing algorithms can be readily applied. The flexibility of the architecture of FIG. 1 can be used not only to meet the changing traffic patterns, but also to handle failures (e.g., a WSS port failure can be taken care of via dynamically assigning that port's wavelength to remaining ports). In addition, the system graphs are inherently fault-tolerant due to their path redundancy and we demonstrate, via simulations, appealing performance in the presence of a large percentage of link and/or node failures.

Figure 4:
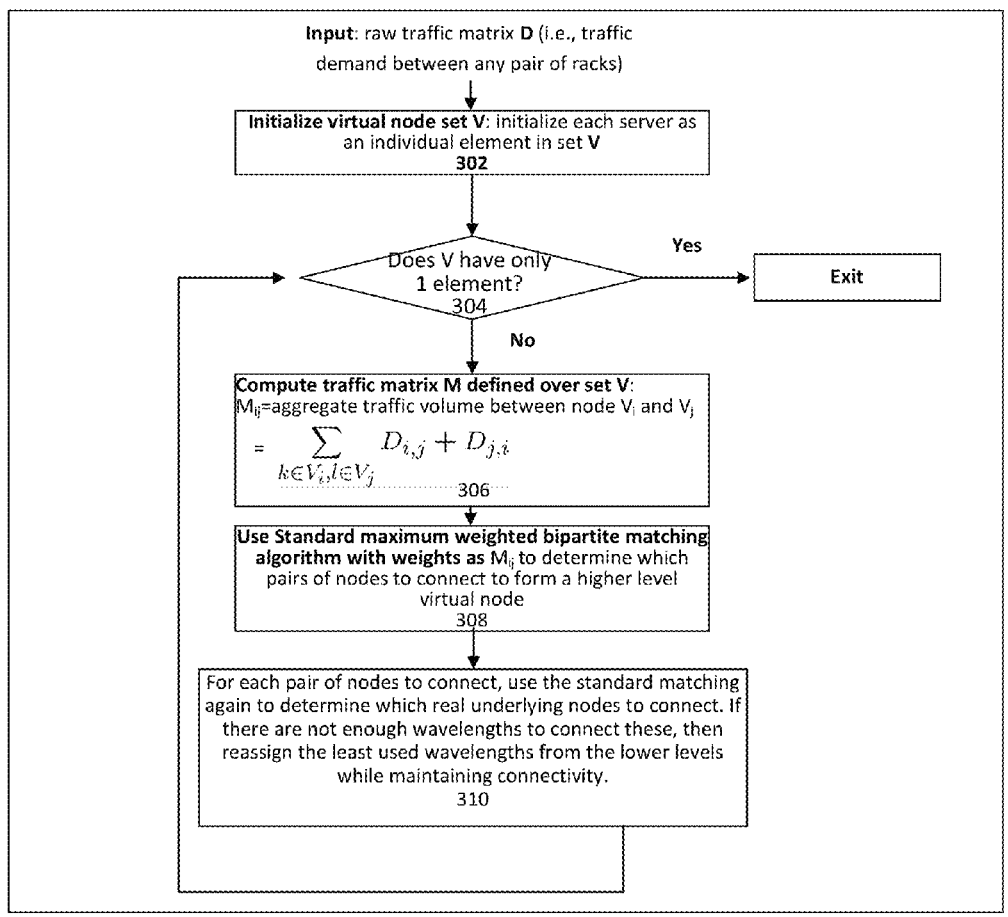
FIG. 4 shows an exemplary Greedy-Tree method to dynamically reconstruct routing paths according to changing network traffic demand.

FIG. 4 shows another exemplary GreedyTree method to dynamically adjust the topology according to changing network traffic demand, different from the above method. This mechanism is a tree inspired design and attempts to form a tree in such a way that traffic is concentrated towards the leaves, so that voluminous flows don't occupy large of hops. In this method, the input is a traffic matrix D (traffic demand between any pair of racks) where Di,j denotes traffic travelling from ToR i to ToR j. D is asymmetric due to the directional nature of network traffic. First, the method initializes a virtual node set V (302). Next, the method checks if V has only one element (304) and if so, exits processing. Alternatively, the method determines a traffic matrix M over the set V (306), and then applies maximum weighted bipartite matching to determine which pairs of nodes should be connected to form a higher level virtual node (308). Next, for each pair of nodes to connect, standard matching is used to determine the real underlying nodes to connect (310). If there are not enough wavelengths to connect the nodes, the method reassigns least used wavelengths from the lower levels while maintaining connectivity (310). The method loops back to 304 until all elements are processed.

In one embodiment, for each iteration, the method attempts to connect pairs of virtual nodes that yield the maximum benefit by finding a matching. The initial set of virtual nodes is the same as the set of ToRs. At every stage, pairs of virtual nodes from the previous stage are connected. The total bandwidth demand across two virtual-nodes is first computed by summing demands from the real nodes in each virtual-node to the other. These pair-wise demands are used as weights for a standard matching algorithm (such as Edmond's algorithm, among others) to obtain the best set of virtual-edges. Each virtual edge can have one or more real edges and a number of wavelengths. These edges and wavelengths are determined by a heuristic-based function which uses matching restricted to only the sets of nodes in the two virtual-nodes being connected. If more wavelengths and links are required than are available from the two virtual-nodes, then links and wavelengths from the lower-level are harvested (least useful at lower-level first) while preserving connectivity. The algorithm iterates until it has built one large virtual node. Once the method terminates, all configurations are pushed to the optical elements.

Figure 5:
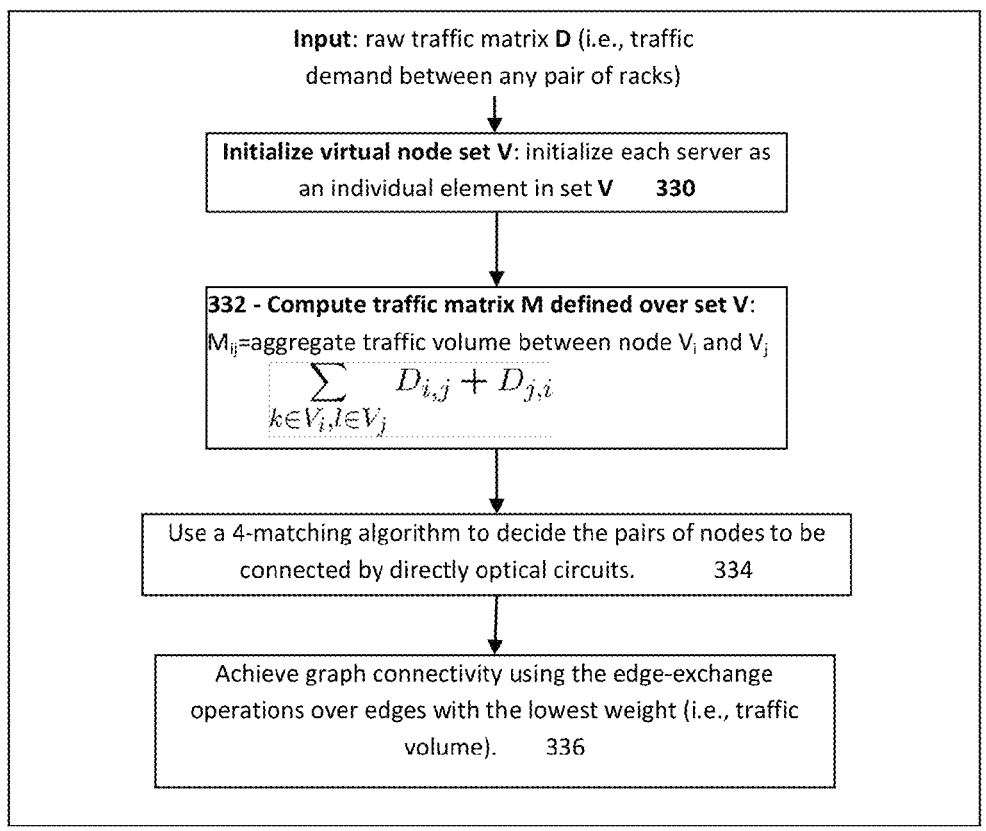
FIG. 5 shows an exemplary Darwinian method to dynamically reconstruct routing paths according to changing network traffic demand.

Another heuristic alternative to FIG. 4 is discussed next. FIG. 5 shows an exemplary Darwinian method to dynamically reconstruct routing paths according to changing network traffic demand. First, the method initializes a virtual node set V (330). Next, the method determines a traffic matrix M over the set V (332), and then applies a 4 matching technique to determine which pairs of nodes should be connected to form a higher level virtual node (334). Next, the method makes the graph connectivity using edge-exchange operations (336).

The Darwinian heuristic attempts to localize high-volume flows over direct circuit links. This is accomplished by using a weighted matching restricted to a degree of 4 (i.e., weighted 4-matching), representing the number of connections each ToR has to the MEMS. However, this does not impose connectivity. Connectivity is ensured using the edge-exchange operation on the edges of lowest weight across pairs of components, thus connecting them. This edge-exchange operation is repeated until connectivity is achieved between all source-destination pairs.

The Darwinian heuristic is based on the idea of starting out with a structured topology (like a k-regular circulant graph, a Kautz digraph, an incomplete hypercube, or even a DCell-like topology) from which the topology keeps evolving. Over this topology, it is possible to use degree-preserving operations to better conform to the traffic matrix. So if two ToRs which seek to establish a high bandwidth connection are connected to two other ToRs and are not serving much transit traffic, they can be connected directly, by breaking one of their current links. The advantage of this method is that it is iterative and each iteration should be computationally inexpensive. It is also likely that a large number of large flows do not change simultaneously, thus a large number of such operations are should rarely be required. It is possible to use this method as a continuous background optimization. The objective is to ensure that a weighted sum of path lengths is minimized.

The GreedyTree and Darwinian heuristics or processes reconstruct the network topology in adaptation to changing traffic demand and can deal with arbitrary traffic patterns. This is in contrast to conventional systems where a particular traffic pattern is assumed. The GreedyTree method intelligently utilizes the switching and reconfiguration functionalities of WSS and adaptively redistributes wavelength assignment to cope with topology and routing changes. This is also the first application of WSS in data center networks.

Once connectivity is achieved, the MEMS configuration is known. The system finds routes using any of standard routing schemes—shortest path or preferably, a low congestion routing scheme. In one embodiment shown in FIG. 6, a simple, yet effective, shortest path routing scheme called Fault-tolerant Proteus Routing (FPR) is used.

Figure 6:
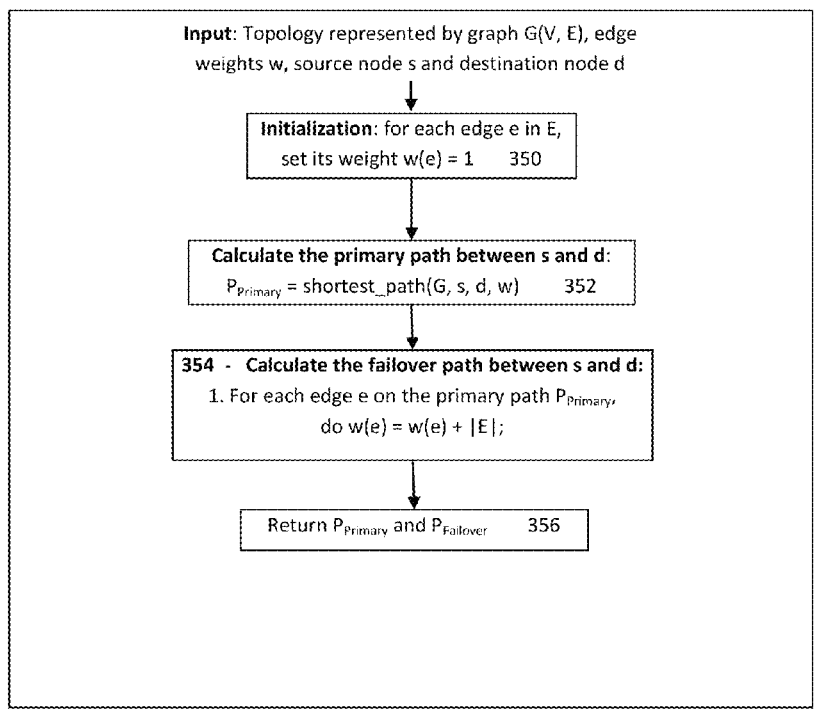
FIG. 6 shows an exemplary fault-tolerant routing method.

In FIG. 6, the input is the topology represented by a graph G(V, E), the edge weights w, the source node s, and the destination node d. During initialization, the weight of each edge is set to one (350). Next, the method determines the primary path between s and d: $P_{Primary}$=shortest_path(G, s, d, w) (352). The method then determines the failover path between s and d (354). In one embodiment, this is done by determining for each edge e on the primary path $P_{Primary}$, calculate w(e)=w(e)+|E|; and $P_{Failover}$=shortest_path(G, s, d, w). Finally, the method returns $P_{Primary}$ and $P_{Failover}$ as the result (356).

The basic idea of FPR is simple. Leveraging on network status, the Manager is responsible for calculating the routing table for each ToR switch. In one embodiment, for simplicity, the shortest path routing method of FIG. 6 is used for routing table construction. However, the scheme is readily applied to any other sophisticated routing calculation. Once link or node failures happen, the related devices will report to the Manager, then the Manager will react by evoking the control software to rearrange the link capacity or topology (based on the degree of failures) to bypass the failed parts. In this sense, FPR is a simple and flexible way to handle failures largely due to the architecture of FIG. 1.

Figure 7:
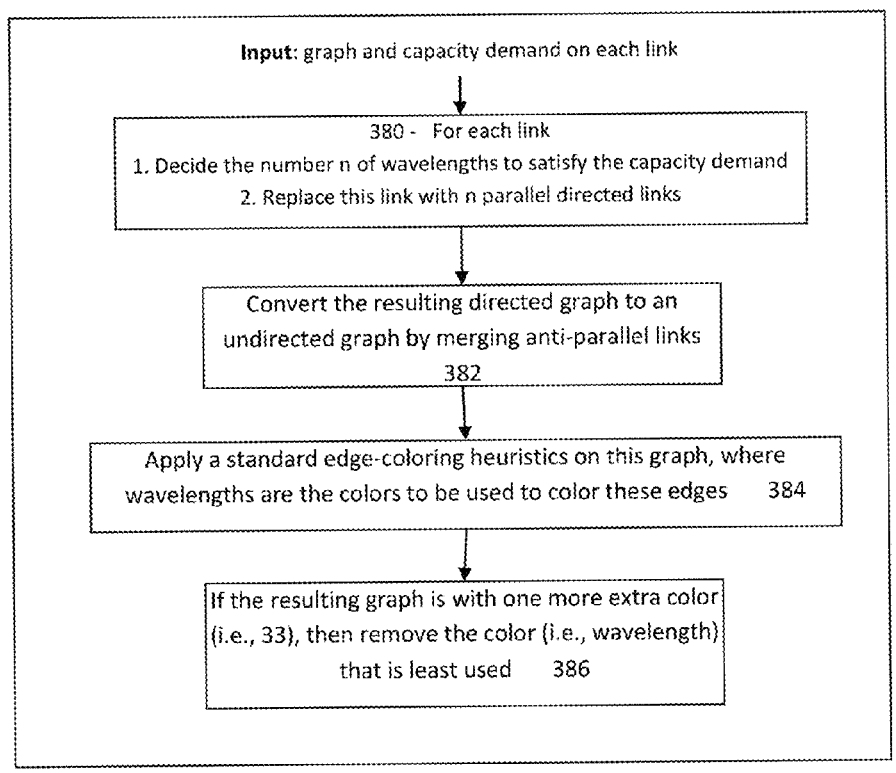
FIG. 7 shows an exemplary wavelength assignment method.

FIG. 7 shows an exemplary wavelength assignment method. Turning now to FIG. 7, the input is a system graph and capacity demand on each link. For each link, the method determines the number n of wavelengths to satisfy the capacity demand and replaces the link with n parallel directed links (380). Next, the method converts the resulting directed graph to an undirected graph by merging anti-parallel links (382). The method then applies a standard edge-coloring heuristics on this graph, where wavelengths are the colors to be used to color these edges (384). If the resulting graph is with one more extra color, then the method removes the color (i.e., wavelength) that is least used (386).

Using the method of FIG. 7, the system provisions or allocates wavelengths to serve capacity requirements. In one example, the system first decides the necessary number (say n) of wavelengths allocated to each optical fiber to meet the capacity requirements and replaces this link with n parallel directed links in the graph. For instance, if each wavelength maximally carries 10 Gb/s and the capacity requirement of a particular link is 45 Gb/s, then the system replaces this link with 5 parallel links in the graph. This way, after this operation, we obtain a graph with degree of 32 for each node. In the second step, the system converts the resulting directed graph to an undirected graph by merging anti-parallel links, i.e., merging the directed link from node u to v and the one from v to u. Now, the system gets a new undirected graph with node degree 32. Then, the system applies a standard edge-coloring heuristics on this graph, where wavelengths are the colors to be used to color these edges. Since the heuristics may end up with coloring the graph with one more extra color (i.e., 33), then the final step is just to remove the color (i.e., wavelength) that is least used.

Next, a hop-by-hop routing method is discussed. This method automatically generates hop-by-hop routing protocols based on network topology changes. This is also a breakthrough in optical communications especially in the context of data center networks, where only point-to-point optical communication is considered.

As the system does not impose the requirement of underlying all-to-all electrical connectivity between the servers, and due to the physical limitation on the number of possible optical paths between servers, the inclusion of hop-by-hop routing is necessary in the design. If a direct optical path does not exist, a hop-by-hop path can be used instead. For this purpose, a multi-hop routing protocol is used. Once a suitable configuration and paths have been computed, these are pushed to all ToRs. ToRs thus know their routes to all other ToRs and use source routing. Each packet from a server destined to some other server outside the ToR is tunneled through this source-routing protocol between ToRs. At the source ToR, a sequence of destination ToRs is specified in the header and sent to the first ToR through the local forwarding table. The first hop then looks at the next hop in sequence and sends the packet to it and this is repeated until the data reaches the destination.

The all-optical network described herein can be easily supplemented with other forms of network connectivity including wireless and electrical networks.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. An all-optical transmission system, comprising:
   an optical switch matrix;
   a plurality of optical components communicating over the optical switch matrix;
   and a top of rack (ToR) switch coupled to each optical components, each ToR communicating with the optical components and with other ToR switches;
   wherein the optical component comprises a send circuit and a receive circuit, the send circuit comprising:
   a ToR transceiver to receive data;
   a multiplexer coupled to the ToR transceiver;
   a Wavelength Selective Switch (WSS) coupled to the multiplexer; and
   a circulator coupled to the WSS.

2. The system of claim 1, wherein the optical switch matrix performs hop-to-hop routing.

3. The system of claim 2, wherein traffic that cannot be provisioned with a direct end-to-end circuit is routed to a destination by traversing multiple hops or TOR switches.

4. The system of claim 1, wherein each TOR switch is coupled to servers.

5. The system of claim 1, wherein each TOR switch receives traffic destined for servers located in its own rack, and forwards transit traffic targeted at servers residing in other racks.

6. The system of claim 1, comprising an inter-ToR port coupled to transceivers associated with a fixed wavelength for sending and receiving data.

7. The system of claim 1, wherein the optical components support on-demand provisioning of connectivity and capacity where required in a network.

8. The system of claim 1, wherein the optical component comprises a Wavelength Selective Switch (WSS) and a circulator.

9. The system of claim 8, wherein the WSS partitions a set of wavelengths coming in through a common port among available wavelength ports.

10. The system of claim 1, wherein the send circuit and receive circuit capacities are independent of each other.

11. The system of claim 1, wherein each of the send circuit and receive circuit is associated with a unique wavelength to use wavelength division multiplexing (WDM).

12. The system of claim 1, comprising a network manager coupled to the optical component.

13. The system of claim 12, wherein the network manager adjusts network topology.

14. The system of claim 12, wherein the network manager assigns pairs with heavy communications to direct links.

15. The system of claim 12, wherein the network manager identifies routing paths and sends all the ToRs these paths in order to set up their routing tables.

16. The system of claim 1, wherein the optical switch matrix comprises micro-electrical-mechanical-systems (MEMS) switches to route optical signals by mechanically adjusting micro mirrors.

17. The system of claim 1, wherein the optical switch matrix comprises bipartite switching matrices where any input port can be connected to any output port.

18. The system of claim 1, comprising a supplementary electrical network or wireless network coupled to the optical transmission system.

19. An all-optical transmission system, comprising:
   an optical switch matrix;
   a plurality of optical components communicating over the optical switch matrix; and
   a top of rack (ToR) switch coupled to each optical components, each ToR communicating with the optical components and with other ToR switches;
      wherein the optical component comprises a send circuit and a receive circuit, the receive circuit comprising;
   a circulator coupled to the optical switch matrix;
   a coupler coupled to the circulator;
   a demultiplexer coupled to the coupler; and
   a ToR transceiver coupled to the demultiplexer.

* * * * *